(12) United States Patent
Brisebois et al.

(10) Patent No.: US 6,310,944 B1
(45) Date of Patent: **\*Oct. 30, 2001**

(54) METHOD FOR ADDING CONTEXT TO COMMUNICATIONS

(75) Inventors: Michel A. Brisebois, Wakefield; Marilyn F. St-George, Alcove; Laura Mahan, Kanata, all of (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,003

(22) Filed: Dec. 17, 1997

(51) Int. Cl.[7] .............................. H04M 1/56; H04M 15/06
(52) U.S. Cl. ................................ 379/142.01; 379/142.06; 379/88.21; 379/93.23
(58) Field of Search ................................ 379/93.35, 142, 379/215–216, 354, 93.23, 88.19–88.21, 127.01, 142.01, 142.06; 455/38.4, 550, 566–567, 575

(56) References Cited

U.S. PATENT DOCUMENTS

| | | | |
|---|---|---|---|
| 4,734,931 | * | 3/1988 | Bourg et al. ................. 379/93.01 |
| 5,210,789 | * | 5/1993 | Jeffus et al. ................. 379/127 |
| 5,303,301 | * | 4/1994 | Takahata ................. 379/142 |
| 5,436,963 | * | 7/1995 | Fitzpatrick et al. ................. 379/212 |
| 5,493,692 | | 2/1996 | Theimer et al. . |
| 5,510,907 | | 4/1996 | Koichi . |
| 5,519,403 | | 5/1996 | Bickley et al. . |
| 5,519,779 | | 5/1996 | Proctor et al. . |
| 5,546,445 | | 8/1996 | Dennison et al. . |
| 5,546,447 | | 8/1996 | Skarbo et al. . |
| 5,550,535 | | 8/1996 | Park . |
| 5,553,120 | | 9/1996 | Katz . |
| 5,555,346 | | 9/1996 | Gross et al. . |
| 5,559,860 | | 9/1996 | Mizikovsky . |
| 5,561,703 | | 10/1996 | Arledge et al. . |
| 5,583,914 | | 12/1996 | Chang et al. . |
| 5,608,788 | * | 3/1997 | Demlow et al. ................. 379/142 |
| 5,651,053 | * | 7/1997 | Mitchell ................. 379/67 |
| 5,754,636 | * | 5/1998 | Bayless et al. ................. 379/142 |
| 5,771,283 | * | 6/1998 | Chang et al. ................. 379/142 |
| 5,832,072 | * | 11/1998 | Rozenblit ................. 379/142 |
| 5,864,612 | * | 1/1999 | Strauss et al. ................. 379/142 |
| 5,867,562 | * | 2/1999 | Scherer ................. 379/127 |
| 5,937,039 | * | 8/1999 | Cho ................. 379/93.17 |

* cited by examiner

Primary Examiner—Duc Nguyen
(74) Attorney, Agent, or Firm—Finnegan, Henderson, Farabow, Garrett & Dunner, L.L.P.

(57) ABSTRACT

A method for augmenting communications between called and calling parties with context information helps either or both parties decide whether and how to accept or initiate a communications event.

11 Claims, 3 Drawing Sheets

METHOD FOR ADDING CONTEXT TO COMMUNICATIONS

In light of the foregoing, there is a need for a method to provide calling and called party context information to help them better decide whether and how to initiate or accept communications.

SUMMARY OF THE INVENTION

Accordingly, methods consistent with the present invention substantially obviate the problems and disadvantages that accompany current communications systems. Current communications systems provide only limited information about to a called party about a calling party and even less information about a calling party to a called party. This information usually consists only of the calling party's number and/or name. This limited information, however, often will not allow the called or calling party to make an informed decision as to whether and how to accept the call. The present invention solves this problem by providing context information to the called or calling parties.

Specifically, a method consistent with this invention includes receiving a request from a calling party to establish a communications link with a called party, gathering context information, providing the gathered context information to the called party, receiving an indication from the called party whether to establish the communications link, and establishing the communications link between the calling party and the called party or not based on the indication.

Another method consistent with this invention includes receiving a request from a calling party to establish a communications link with a called party, gathering context information, providing the gathered context information to the calling party, receiving an

BACKGROUND OF THE INVENTION

The present invention relates generally to identification of called and calling parties to each other, and more specifically to providing information to called and calling parties indicating the context of a communication event.

In the field of communications, there has been a trend toward providing users with increased functionality to better manage and control their communication media. For example, in telephony, many service providers offer caller identification and caller name services to their customers. These services allow the called party to see the phone number and name of the calling party before answering the telephone. Based on this limited information, the called party can decide whether to answer the call.

Simply providing the caller's phone number and name, however, often does not provide enough information for the called party to determine whether to answer the call. Suppose, for example, the caller information indicates that John Doe is calling from a New York number. Unless the called party knows John Doe, this information is not helpful in deciding to accept or decline the call.

Also, current systems provide no information to a calling party about a person to be called. There may be instances in which a party to be called does not wish to be disturbed, or only wishes to be disturbed for emergencies. The existing network does not provide a mechanism for sending this information to a calling party so that the calling party can make a decision as to whether to place the call. indication from the calling party as to whether to establish the communications link, and establishing the communications link between the calling party and the called party or not based on the indication.

Other features and advantages of the invention will be set forth in the description which follows, and in part will be apparent from the description, or may be learned by practice of the invention. The objectives and other advantages of the invention will be realized and attained by the methods and apparatus particularly pointed out in the written description and claims hereof as well as the appended drawings.

Both the foregoing general description and the following detailed description are exemplary and explanatory only, and are intended to provide further explanation of the invention as claimed. The accompanying drawings provide a further understanding of the invention and are incorporated in and constitute a part of this specification. They illustrate embodiments of the invention, and together with the description serve to explain the principles of the invention.

DETAILED DESCRIPTION

Reference will now be made in detail to the present preferred embodiments consistent with the invention, an example of which is illustrated in the accompanying drawings. Wherever possible, the same reference numbers will be used throughout the drawings to refer to the same or like parts.

Context information is information relating to the parties to a communication event or relating to the communication event itself. Unlike traditional caller ID and caller name services, context information is dynamic; it can vary from call to call. Context information can be valuable to both calling and called parties. Generally, a calling party can add context information to the name and number identification that the service provider will deliver to the called party. This added information can inform the called party about the context of that particular call to help decide whether and how to accept the call. Context information can be set by a called party, too. Called party context information would be sent to the calling party as a network predial information window. The information would allow the calling party to make a more informed decision as to whether and how to place the call.

A. Calling Party Context Identification

Figure 1:
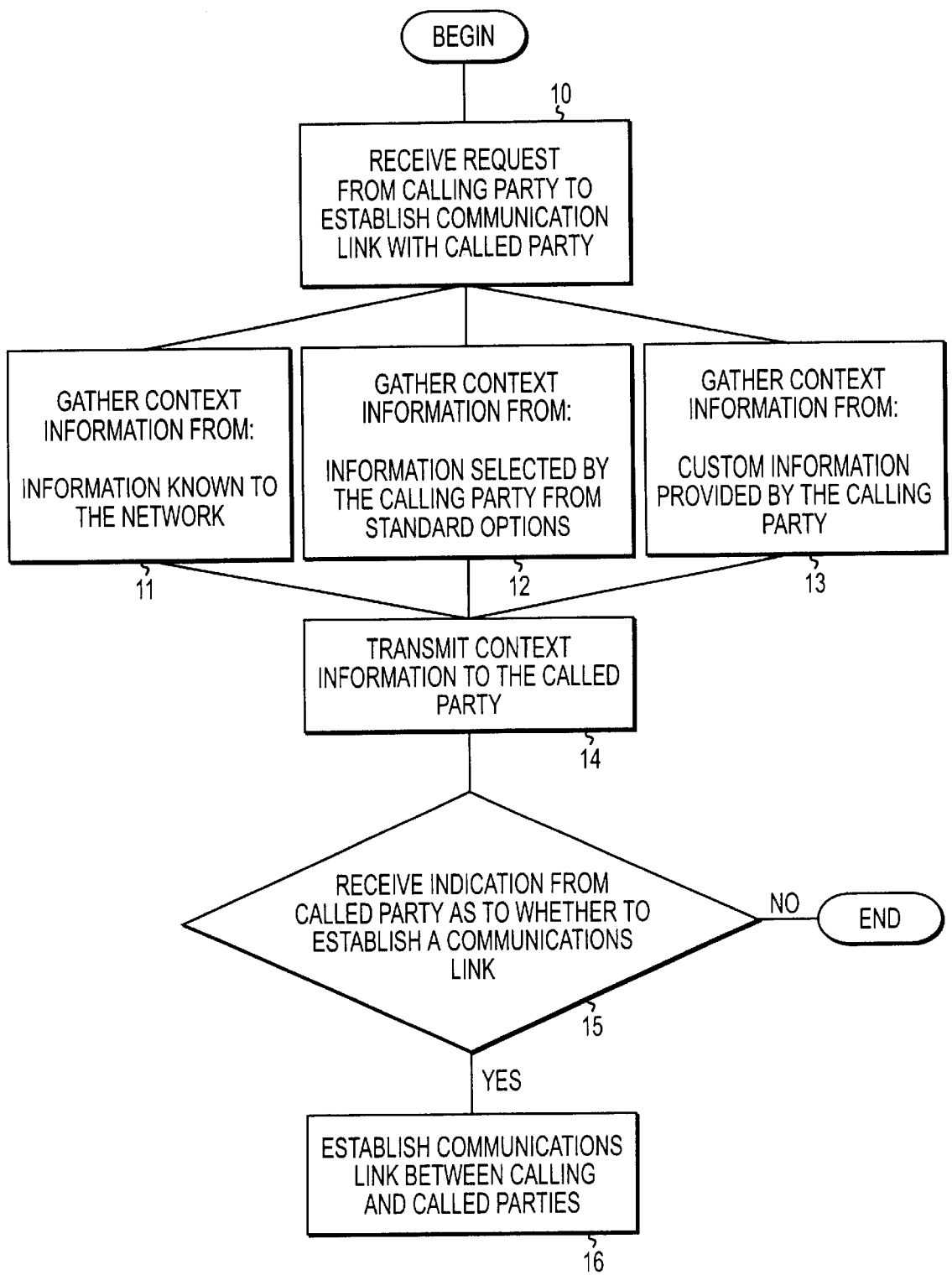
FIG. 1 is a flowchart showing a method for providing context information to a called party consistent with the present invention.

As shown in FIG. 1, calling party context identification begins with a request from a calling party to establish a communication link with a called party (step 10). Such a request would take different forms depending on the communication medium. If the calling party is using an analog display services interface ("ADSI") phone, for example, he would merely dial the number of called party. If the calling party is using a computer to communicate over the internet, he would enter the email or IP address of the called party. In response to such a request, the network gathers context information (steps 11, 12, and 13). Preferably, calling party context identification can be gathered from one or more of three sources: automatic creation (step 11), standard options selection (step 12), and/or full custom creation (step 13).

1. Automatic Creation

A network can automatically create context information by collecting data already in its possession and sending it to the called party. One benefit of this method of creating context information is that the called party need not perform any additional steps when placing a call to send the context information. For example, suppose the calling party returns a call left by the called party in a specific messaging environment such as voice mail, electronic mail, internet voice, video messaging, paging, fax, or a shared work file. The network, then, has context information indicating who left the message, at what time and date, and possibly information relating to the subject of the message. When the calling party returns the call, the network could send that context information to the called party. The called party would then know not only the identity of the calling party, but also that the calling party was returning a message left at a certain time and date.

It would also be possible for the network to create context information automatically even when no prior context exists between the parties if the calling party places a call from a specific messaging environment. For example, suppose the calling party initiates a call within an application having a "corporate directory" of numbers. The context information would indicate to the called party that the call is from a business colleague.

The network can also collect information relating to whether the calling party is placing a call using a network custom calling feature. For example, telephone companies offer features such as call return and three-way conferencing. If the called party uses one of these features, the context information would indicate to the called party that the call is a return call or that the call is a conference call and who is already connected.

If the calling party places a call from a remote location (e.g., from a cellular phone), the network can automatically create context information from the geographic location of the caller, such as the local subscriber's name of the locale where the call is placed, the nearest end office switching area where the call is being placed, or the cell site name. If a wireless device is GPS (Global Positioning System) compatible, the network can match GPS data to a location translation table. Alternatively, smart room information transmitters in certain rooms or buildings could provide specific location information to the network, which could, in turn, provide this information as context information to the called party.

2. Standard Options Selection

Standard options selection allows the calling party to select from a number of calling options. The options can be pre-determined by the service provider or created by the user at the installation stage. To implement this context information, the calling party could select a coding scheme before dialing. Using selectable soft-keys, special star codes, menu options, voice commands, or other mechanisms, the calling party can choose from context information options.

For example, the calling party could select a priority tag to be attached to the caller identification information indicating that the call is low, medium, or high priority. The called party could also choose a medium or combination of media prior to placing a call to indicate to the called party the media expectation of the calling party. If, for example, the calling party requests a voice and video call, the called party would be apprised of this context information.

The calling party could also select the synchronicity of the communication event, which would indicate to the called party whether active participation was required. For example, the calling party could select a voice call as the medium and then select an asynchronous event. This voice call would then be delivered as a one-way communication which would not require the called party to "connect." The context information could also include an option for acknowledgment of receipt from the called party.

In addition, the calling party could select an option whereby the called party is asked if he is willing to share the cost of a broadband connection. This option could be useful with service providers who charge for the medium based on time and/or bandwidth usage. The called party, then would decide whether to accept the communication and, thus, pay a share of the costs. This type of standard option would be tied into the service provider's billing records.

As a final example, the calling party could select available disposition options of the called party to allow communication closure that is appropriate to the context of the calling/called party. For example, the calling party could attach a "hotline" softkey to give the called party one time access to a cell phone line.

3. Full Custom Creation

Full custom creation allows the calling party to add context information created on a per call basis. The context information could take a number of forms, depending on the communication medium. For example, the calling party could choose to send a custom name for caller name delivery, thus replacing the service provider's subscriber name to something more specific and appropriate to the context. The calling party could also send a specific reply request along with instructions as to how to respond. In addition, the calling party could attach a topic header to the communication event. This topic header could be in the form of a text message or of a voice announcement played between rings of the called party's telephone. As another example, the calling party could send information indicating the expected demand on the called party. The expected demand could be, for example, an indication of the estimated time required to complete the communication event.

The calling party could also attach a computer file as part of full custom creation of context identification. This type of information is very flexible and valuable in establishing an exact context for the call and can even ensure that supporting documentation or other media is available with the caller identification information. Suppose, for example, that the called party receives a call from John Doe at a New York number. Unless the called party knows John Doe, this information alone does not help the called party decide whether to answer the call. If, however, John Doe has attached context information indicating that the call is about insurance renewal and has included a text copy of the current policy, the called party will likely accept the call. Without this context information, the called party may have dismissed the call.

As a final example, suppose the calling party is placing an order through a mail order number. If the calling party has previously dealt with the mail order company, he could attach an account or reference number to the call, or information concerning the desired purchase. The mail order company, in turn, could use this information to more efficiently direct and process the incoming call.

Once the network has gathered context information from one or more of the above-described sources, it transmits the context information to the called party (step 14). The called party, in turn, decides whether to establish a communications link with the calling party and indicates his decision to the network (step 15). This indication could take different forms depending on the medium of communication. For example, if the called party is using an ADSI phone, he would indicate his desire to connect with the calling party by simply lifting the receiver. If the called party is using a computer to communicate over the internet, he would perform the keystrokes appropriate to the internet application. Upon receiving this indication from the called party, the network establishes a link between the called and calling parties (step 16). On the other hand, if the called party decides, based on the context information, not to establish a link with the calling party, the communication event ends.

B. Called Party Context Identification

As a complement to calling party context identification, called party context identification allows the calling party to determine the called party's context before placing the call. The context information would enable calling parties to make a more informed decision as to whether to place the call, set a certain priority on the call, select a medium that is appropriate to the called party's context, or choose other parameters.

Figure 2:
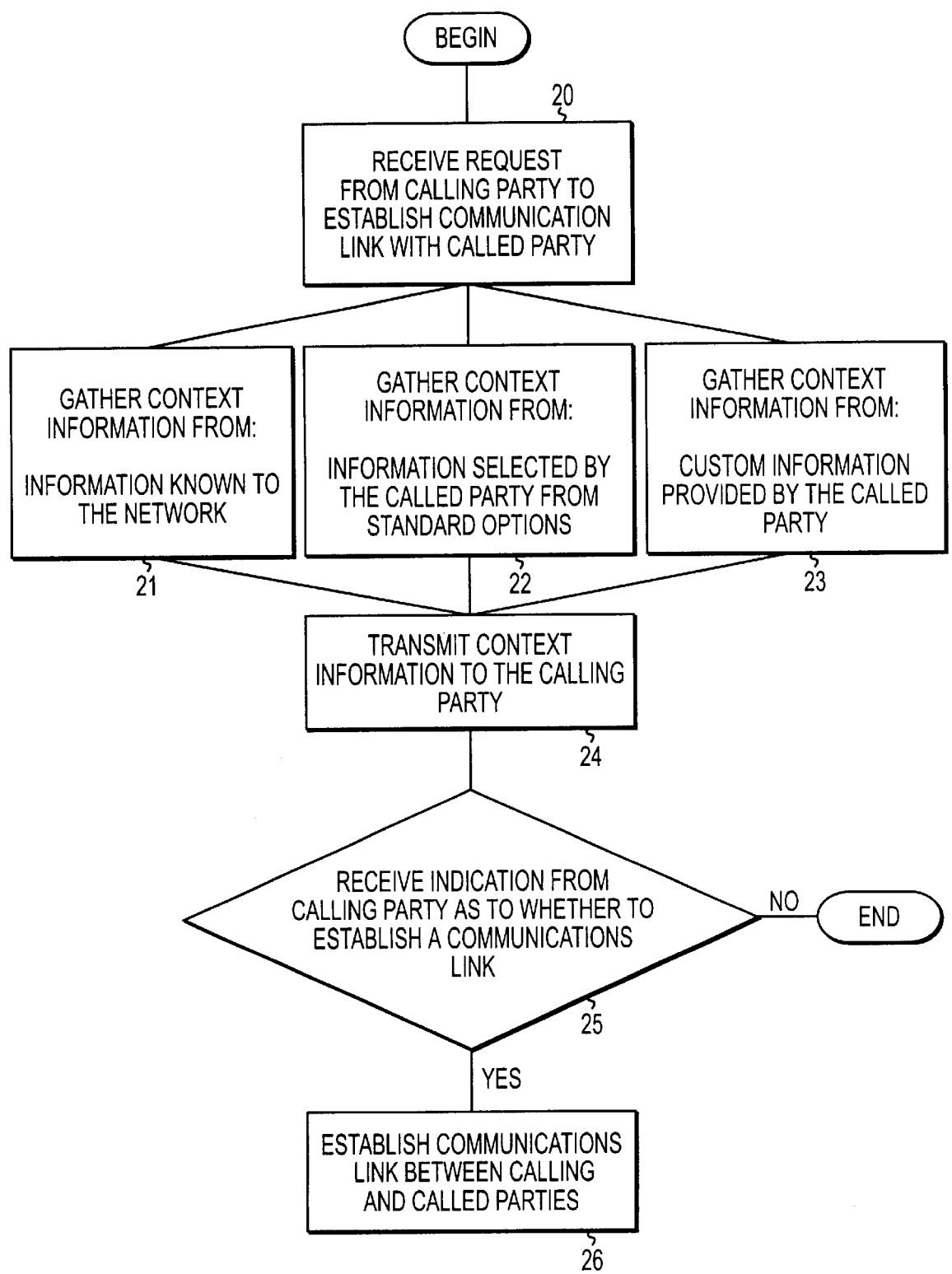
FIG. 2 is a flowchart showing a method for providing context information to a calling party consistent with the present invention.

As shown in FIG. 2, called party context information begins with a request from a calling party to establish a communication link with a called party (step 20). Such a request will be initiated in accordance with the particular medium of communication, as discussed above in connection with step 10. Upon receiving this request, the network gathers context information (steps 21, 22, and 23). Preferably, called party context identification can be gathered from one or more of three sources: automatic creation (step 21), standard options selection (step 22), and full custom creation (step 23).

1. Automatic Creation

As with calling party context identification, automatic creation requires no steps by the called party to send context information to a calling party. Instead, the network gathers information already available to it. For example, the calling party could receive the name of the called party before placing the call in order to verify that the phone number is the desired called party.

The network could also relay location information to the calling party. For example, the network could include the local subscriber's name of the locale of the called number, the nearest end office switching area of the called number, or the cell site name if the call is to a wireless device. Also, if a wireless device is GPS-compatible, the network can match GPS data to a location translation table. Or, smart room information transmitters in certain rooms or buildings could provide specific location information to the network, which the network can send as context information to the calling party.

The network could also provide information regarding the available bandwidth or types of media. For example, if the calling party wished to attach a computer file to the call, it may be important to know the bandwidth available between himself and the desired called party. Alternatively, the network could inform the calling party as to whether the desired called party can receive voice calls or video calls.

2. Standard Options Selection

Standard options selection allows the called party to select from predetermined options as he changes context. To implement this context information, the called party could select a coding scheme. Using selectable soft-keys, special star codes, menu options, voice commands, or other mechanisms, the called party can choose from the desired context information options.

For example, the called party could select one of various busy filters to inform a calling party that the called party does not wish to be disturbed or will only accept emergency calls. The called party could also select context information relating to media preferences. For example, even if the called party has both voice and video available to him, he may only wish to use voice. This information could be sent to a calling party as context information. Other options include synchronicity preferences, such as synchronous voice only, or standard disposition options, such as access to voice mail or access to a routed path.

3. Full Custom Creation

The called party could also create full custom context information. This context information could include, for example, information as to the specific availability of the called party for types of communication events. The context information could also include custom disposition options based on the mutual context of both calling parties. For example, the called party could set special disposition options based on the identity of the calling party. If the calling party was the called party's spouse, the called party may want to make certain disposition options available to the spouse, but not to others. The called party could also record preset messages that are played to the calling party.

Full custom creation could also be useful where a calling party calls a mail order company to place an order. The mail order company could collect information about the calling party including, for example, the types of products typically purchased, and provide context information that may be useful to the calling party. This could include information about related products or current discounts on products previously purchased by the calling party.

Once the network has gathered context information from one or more of the above-described sources, it transmits the context information to the calling party (step 24). The calling party, in turn, decides whether to establish a communications link with the called party and indicates his decision to the network (step 25). This indication could take different forms depending on the medium of communication. For example, if the calling party is using a telephone, he could indicate his desire to connect with the called party using, for example, menu options provided by the service provider. If the calling party is using a computer to communicate over the internet, he would perform the keystrokes appropriate to the internet application. Upon receiving this indication from the calling party, the network establishes a link between the called and calling parties (step 26). On the other hand, if the calling party decides, based on the context information, not to establish a link with the called party, the communication event ends.

C. Implementation

Any of the context information discussed herein, which can be in the form of audio, text, graphics, video, tactile coding, or any combination of these, can be linked to the caller identification signaling protocol provided by the operating company. The linking is achieved by synchronizing existing or future signaling protocols.

Figure 3:
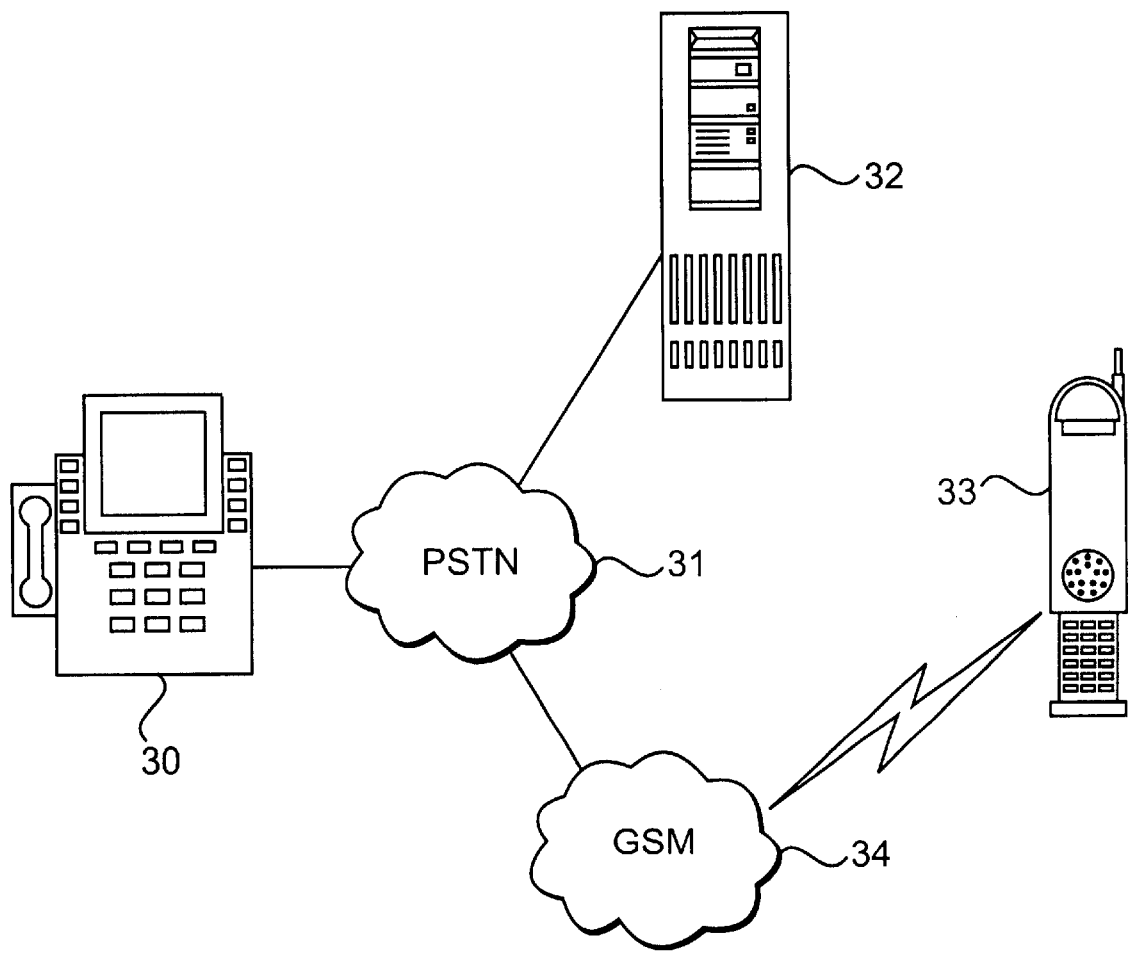
FIG. 3 is a diagram of a network configuration for implementing a system consistent with the present invention.

Specifically, FIG. 3 shows a configuration for implementing various types of context information. In the case of automatic creation of calling context information, suppose the calling party on Global System for Mobility ("GSM") handset 33 places a call to the called party on ADSI phone 30. The GSM network 34 identifies the GSM handset 33 with the name and number of the subscriber, along with GPS coordinates or the cell ID. This information and the call request are routed to the public switching telephone network ("PSTN") 31. Server 32 identifies the called party as an ADSI call context subscriber. Server 32 then matches the GPS or cell ID to a location translation table, and sends the subscriber information and location information to ADSI phone 30 as part of the call request. This is done, for example, by synchronizing Bellcore's existing TR30/31 CLASS protocol, which describes how to send name and number identification, with the delivery of text-based information using Bellcore's TR1273 ADSI protocol.

For automatic creation of called party context information, suppose the called party is on GSM handset 33 and is a subscriber to the call context feature. The calling party places a call to GSM handset 33 on ADSI phone 30 through PSTN 31. Server 32 requests the name of the called party, along with GPS coordinate or the cell ID, from GSM network 34. GSM network 34 provides this information to server 32 which, in turn, sends the information to ADSI phone 30 as a text-based message. Using this information, the calling party indicates to server 32 whether he wishes to complete the call by, for example, selecting an appropriate soft-key. If the calling party wishes to complete the call, server 32 would place a call request to GSM network 34, and the call would complete as usual.

In the case of standard options creation for calling party context information, suppose that the calling party, on ADSI phone 30, has subscribed to the call context feature from the local service provider. Using the ADSI protocol, server 32 loads a call context service script into the subscriber's ADSI phone 30 via PSTN 31. When the calling party goes off-hook, the call context options appear as soft-keys. Suppose the calling party initiates a call to a called party on GSM handset 33. The calling party could select a soft-key indicating that he desired a voice connection with the called party. Server 32 sends this short message along with the call request information over PSTN 31 to GSM network 34. The called party receives the standard call request information from GSM network 34, along with the context message.

Similarly, for standard options creation for called party identification, suppose the called party, on GSM handset 33, is a subscriber to the call context feature. At an earlier time, the called party, using menu options or star commands, could select various options that would be stored on server 32. For example, the called party could select an option indicating that he can receive only voice communications. When the calling party, on ADSI phone 30, places a call to GSM handset 33, server 32 recognizes the called party as a subscriber to the call context feature and provides the pre-selected context information to ADSI phone 30 via PSTN 31. Based on this information, the calling party indicates to server 32 whether to complete the call by using, for example, soft-keys on ADSI phone 30.

In the case of full custom creation calling context, the steps are the same as in standard options calling context creation, except that the calling party could type a custom message before placing the call. This message is received by server 32 and interpreted as a call header. Server 32 then sends the message as a short message through GSM network 34 to the subscriber on GSM handset 33.

Similarly, full custom creation called context proceeds as described above with respect to standard options called context creation, except that the called party could enter a custom message. For example, the called party could type in a custom subscriber name in place of the standard subscriber name stored on server 32. This could be done, for example, using the lettered numbers on GSM handset 33. Server 32 would then send the custom subscriber name to the calling party on ADSI phone 30 in place of the standard subscriber name.

It will be apparent to those skilled in the art that various modifications and variations can be made in the present invention without departing from its spirit or scope. Thus, it is intended that the present invention cover the modifications and variations of this invention provided they come within the scope of the appended claims and their equivalents.

We claim:

1. A method for augmenting communication over a communications network comprising the steps performed by the network of:

receiving a request from a calling party to establish a communications link with a called party;

gathering context information known to the communications network;

gathering context information from a selection of pre-determined options by the calling party;

gathering specific context information supplied by the calling party;

automatically providing the gathered context information to the called party;

receiving an indication from the called party as to whether to establish the communications link; and establishing the communications link between the calling party and the called party or not based on the indication.

2. The method of claim 1 wherein the step of gathering context information known to the communications network includes the step of gathering information indicating whether the calling party is using a network or service provider custom calling feature.

3. The method of claim 1 wherein the step of gathering context information known to the communications network includes the step of gathering information indicating the location and local time of the calling party.

4. The method of claim 1 wherein the step of gathering context information from a selection of pre-determined options includes the step of gathering information indicating the media expectation of the calling party.

5. The method of claim 1 wherein the step of gathering specific context information supplied by the calling party includes the step of gathering a custom name in place of the subscriber name associated with the calling party.

6. The method of claim 1 wherein the step of gathering specific context information supplied by the calling party includes the step of gathering a topic header.

7. The method of claim 1 wherein the step of gathering specific context information supplied by the calling party includes the step of gathering a computer file to be attached to the communication.

8. The method of claim 1 wherein the step of gathering specific context information supplied by the calling party includes the step of gathering information indicating the expected demand on the called party.

9. A method for augmenting communications over a communications network comprising the steps performed by the network of:

receiving a request from a calling party to establish a communications link with a called party;

gathering context information known to the communications network;

automatically providing the gathered context information to the called party;

receiving an indication from the called party whether to establish the communications link; and establishing the communications link between the calling party and the called party or not based on the indication, wherein the step of gathering context information known to the communications network includes the step of gathering information indicating whether the calling party is returning a communication from a called party.

10. A method for augmenting communications over a communications network comprising the steps performed by the network of:

receiving a request from a calling party to establish a communications link with a called party;

gathering context information from a selection of pre-determined options by the calling party;

automatically providing the gathered context information to the called party;

receiving an indication from the called party whether to establish the communications link; and establishing the communications link between the calling party and the called party or not based on the indication, wherein the step of gathering context information from a selection of predetermined options includes the step of gathering information indicating the synchronicity of the communication.

11. A method for augmenting communications over a communications network comprising the steps performed by the network of:

receiving a request from a calling party to establish a communications link with a called party;

gathering context information;

providing the gathered context information directly to the calling party;

receiving an indication from the calling party as to whether to establish the communications link; and establishing or not establishing the communications link between the calling party and the called party based on the indication;

wherein the step of gathering context information includes the step of gathering context information from a selection of pre-determined options by the called party including gathering information indicating media preferences of the called party.

* * * * *